United States Patent
Huang et al.

(10) Patent No.: US 12,494,831 B2
(45) Date of Patent: Dec. 9, 2025

(54) CHANNEL STATE INFORMATION (CSI) FEEDBACK FOR PHYSICAL DOWNLINK CONTROL CHANNEL (PDCCH)

(71) Applicant: QUALCOMM Incorporated, San Diego, CA (US)

(72) Inventors: Yi Huang, San Diego, CA (US); Wanshi Chen, San Diego, CA (US); Juan Montojo, San Diego, CA (US); Wei Yang, San Diego, CA (US); Yu Zhang, San Diego, CA (US); Huilin Xu, Temecula, CA (US); Hwan Joon Kwon, San Diego, CA (US); Krishna Kiran Mukkavilli, San Diego, CA (US); Tingfang Ji, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 18/012,067

(22) PCT Filed: Aug. 7, 2020

(86) PCT No.: PCT/CN2020/107669
§ 371 (c)(1),
(2) Date: Dec. 21, 2022

(87) PCT Pub. No.: WO2022/027547
PCT Pub. Date: Feb. 10, 2022

(65) Prior Publication Data
US 2023/0246686 A1    Aug. 3, 2023

(51) Int. Cl.
*H04B 7/06* (2006.01)
*H04B 7/0456* (2017.01)
(Continued)

(52) U.S. Cl.
CPC .......... *H04B 7/0626* (2013.01); *H04B 7/0456* (2013.01); *H04L 5/0051* (2013.01); *H04L 5/0053* (2013.01); *H04W 72/232* (2023.01)

(58) Field of Classification Search
CPC ... H04B 7/06; H04B 7/04; H04B 7/02; H04B 17/33; H04B 17/34; H04B 17/30;
(Continued)

(56) References Cited

U.S. PATENT DOCUMENTS 9,462,573 B2 * 10/2016 Seo ........................ H04L 5/0023
10,484,156 B2 * 11/2019 Li ........................... H04L 5/0053
(Continued)

FOREIGN PATENT DOCUMENTS

| CN | 110719137 A | 1/2020 |
| CN | 110731112 A | 1/2020 |

(Continued)

OTHER PUBLICATIONS

Supplementary European Search Report—EP20948353—Search Authority—The Hague—Apr. 25, 2024.
(Continued)

*Primary Examiner* — Man U Phan
(74) *Attorney, Agent, or Firm* — Guang Y. Zhang; Loza & Loza LLP

(57) ABSTRACT

This disclosure provides systems, methods, apparatus, computer programs encoded on computer readable-medium to provide a user equipment (UE) to receive a reference signal from a base station, wherein the reference signal is received within a frequency-time region that overlaps with a control channel frequency-time region, generate information related to a control channel between the UE and the base station based on the reference signal, and transmitting the information to the base station.

40 Claims, 10 Drawing Sheets

(51) Int. Cl.
*H04L 5/00* (2006.01)
*H04W 72/232* (2023.01)

(58) Field of Classification Search
CPC ..... H04L 5/00; H04L 1/00; H04L 1/18; H04L 1/16; H04L 25/02; H04L 27/26; H04W 72/23; H04W 72/04; H04W 72/10; H04W 72/08; H04W 72/25; H04W 72/12; H04W 72/40; H04W 74/08; H04W 76/27; H04W 80/02; H04W 88/08; H04W 48/10; H04W 24/08; H04W 24/10; H04W 25/02
USPC .......................................................... 370/329
See application file for complete search history.

(56) References Cited

U.S. PATENT DOCUMENTS

| | | | | |
|---|---|---|---|---|
| 10,764,919 | B2* | 9/2020 | Noh | H04L 1/1864 |
| 10,827,474 | B2 | 11/2020 | John Wilson et al. | |
| 11,178,657 | B2* | 11/2021 | Luo | H04W 72/23 |
| 11,212,825 | B2* | 12/2021 | Gong | H04W 72/1273 |
| 11,245,440 | B2* | 2/2022 | Hwang | H04W 72/30 |
| 11,343,043 | B2* | 5/2022 | Kwak | H04L 5/0051 |
| 11,350,418 | B2* | 5/2022 | Lin | H04L 5/10 |
| 11,470,489 | B2* | 10/2022 | Islam | H04L 1/0026 |
| 11,968,138 | B2* | 4/2024 | Cha | H04B 7/088 |
| 2012/0281640 | A1* | 11/2012 | Xu | H04L 5/0048 370/329 |
| 2015/0063177 | A1 | 3/2015 | Kim et al. | |
| 2019/0246384 | A1* | 8/2019 | Shao | H04W 72/044 |
| 2020/0045708 | A1* | 2/2020 | Hwang | H04L 5/10 |
| 2020/0229008 | A1 | 7/2020 | Islam et al. | |

FOREIGN PATENT DOCUMENTS

| | | |
|---|---|---|
| WO | WO-2018208792 | 11/2018 |
| WO | 2020153809 A1 | 7/2020 |

OTHER PUBLICATIONS

International Search Report and Written Opinion—PCT/CN2020/107669—ISA/EPO—May 11, 2021.

Qualcomm Incorporated: "CR for Default QCL Assumption for Rel. 16 Cross-Carrier Scheduling", 3GPP TSG-RAN WG1 #100-e, R1-2000983, 3rd Generation Partnership Project (3GPP), Mobile Competence Centre; 650, Route Des Lucioles; F-06921 Sophia-Antipolis Cedex; France, vol. RAN WG1, No. Feb. 24, 2020-Mar. 6, 2020, Feb. 15, 2020 (Feb. 15, 2020), 5 Pages, XP051853556, p. 5-p. 6, Section 2.

* cited by examiner

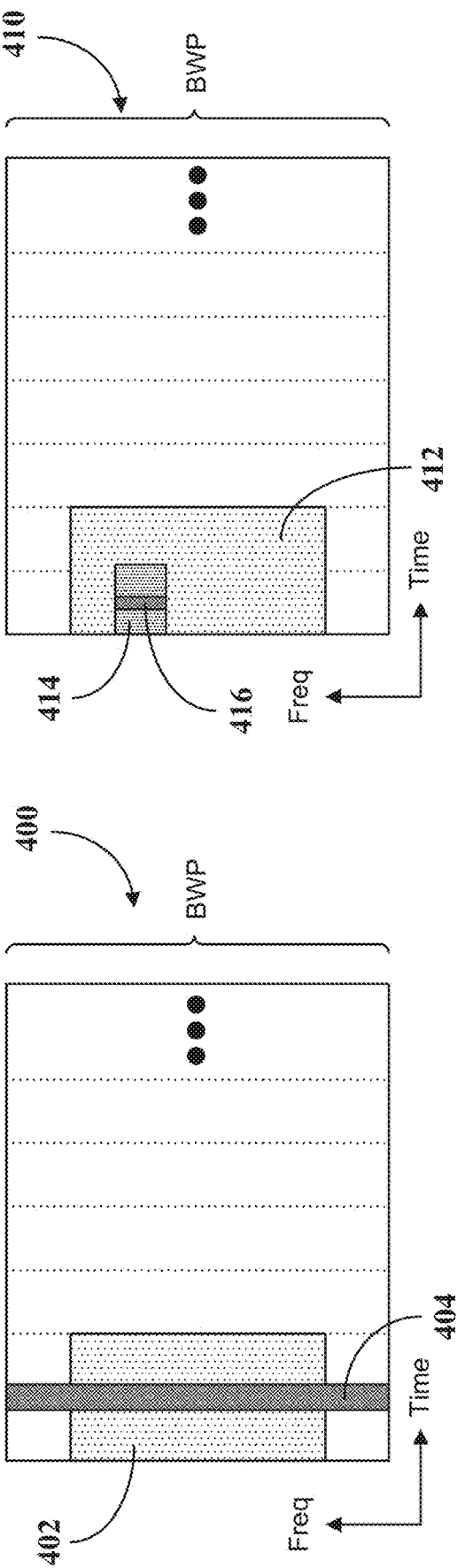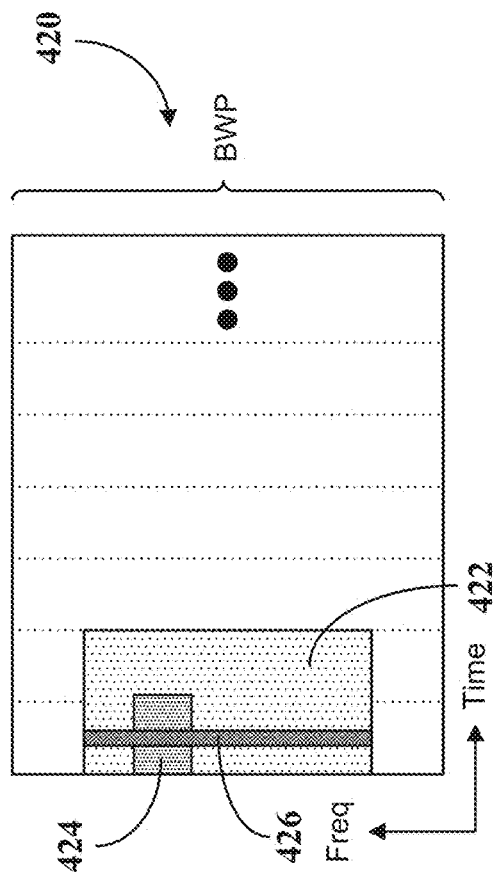
FIG. 4A
FIG. 4B
FIG. 4C

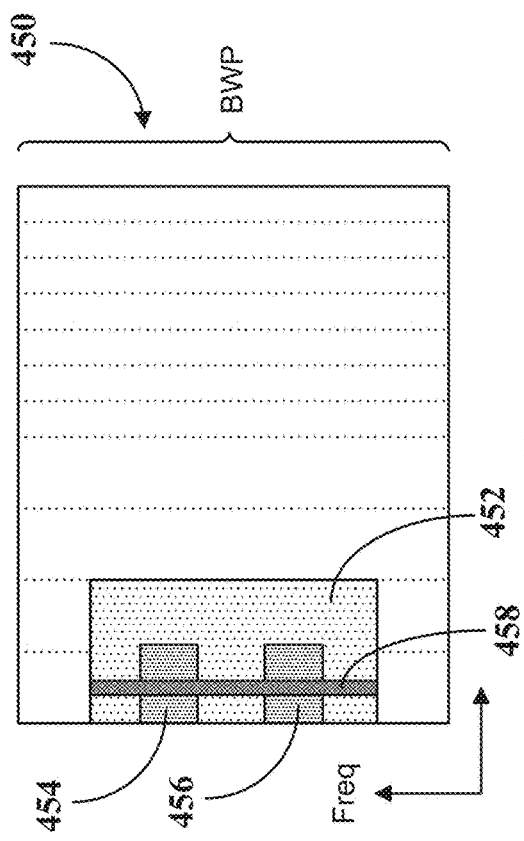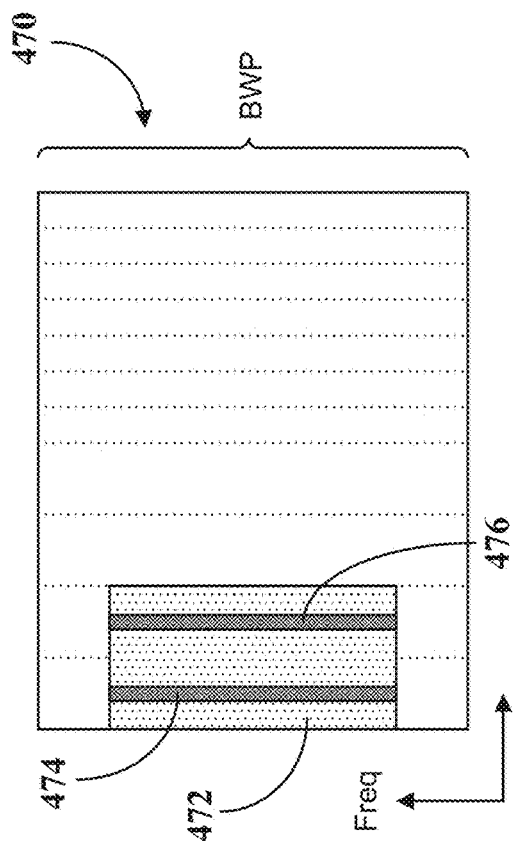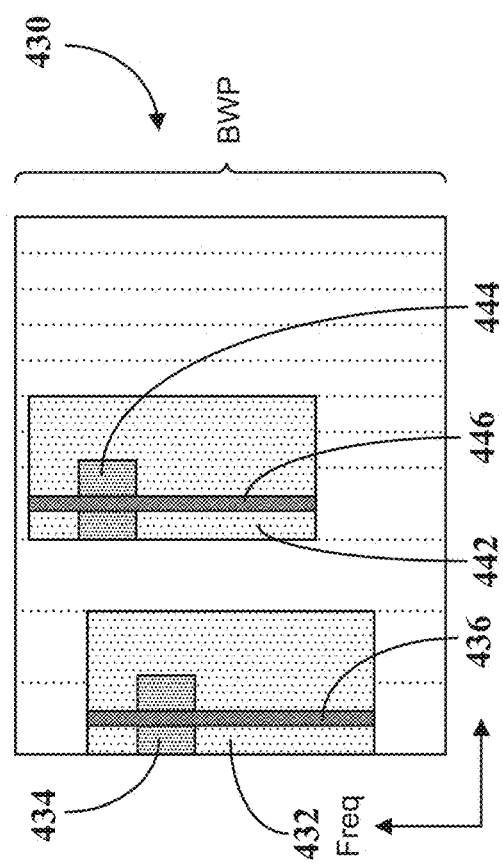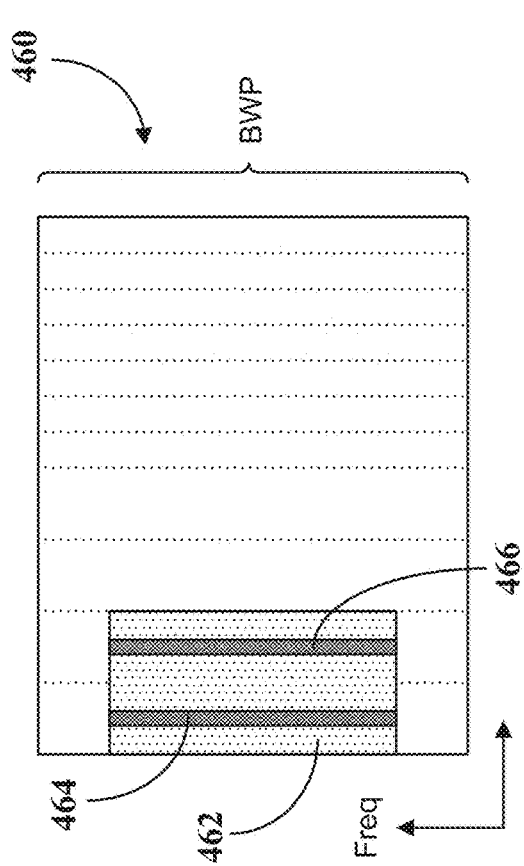

CHANNEL STATE INFORMATION (CSI) FEEDBACK FOR PHYSICAL DOWNLINK CONTROL CHANNEL (PDCCH)

CROSS-REFERENCE TO RELATED APPLICATION(S)

This application for patent is a U.S. National Stage entry of PCT Patent Application No. PCT/CN2020/107669 filed 7 Aug. 2020, and assigned to the assignee hereof and hereby expressly incorporated by reference herein as if fully set forth below in its entirety and for all applicable purposes.

TECHNICAL FIELD

The technology discussed below relates generally to wireless communication systems or networks, and more particularly, for a user equipment (UE) providing channel state information (CSI) feedback or report pertaining to a physical downlink control channel (PDCCH) to a base station (BS). The BS using the CSI feedback or report to adjust the transmission of the PDCCH signal for the UE.

DESCRIPTION OF THE RELATED TECHNOLOGY

In many existing wireless communication systems, a cellular network is implemented by enabling wireless user equipment to communicate with one another through signaling with one or more nearby base stations or cells. To improve the transmission between a base station and a wireless user equipment, the condition or characteristic of the channel between the base station and user equipment should be assessed. Based on the channel assessment, the base station may tailor the transmissions for the user equipment.

SUMMARY

The systems, methods and devices of this disclosure each have several innovative aspects, no single one of which is solely responsible for the desirable attributes disclosed herein.

One innovative aspect of the subject matter described in this disclosure relates to a method for wireless communication at an apparatus of a user equipment (UE). The method includes receiving a reference signal from a base station, wherein the reference signal is received within a frequency-time region that overlaps with a control channel frequency-time region; generating information related to a control channel between the UE and the base station based on the reference signal; and transmitting the information to the base station.

Another innovative aspect of the subject matter described in this disclosure can be implemented in a user equipment, including a wireless transceiver; and a processor configured to: receive a reference signal from a base station via the wireless transceiver, wherein the reference signal is received within a frequency-time region that overlaps with a control channel frequency-time region; generate information related to a control channel between the UE and the base station based on the reference signal; and transmit the information to the base station via the wireless transceiver.

Another innovative aspect of the subject matter described in this disclosure can be implemented in an apparatus for wireless communication including means for receiving a reference signal from a base station, wherein the reference signal is received within a frequency-time region that overlaps with a control channel frequency-time region; means for generating information related to a control channel between the apparatus and the base station based on the reference signal; and means for transmitting the information to the base station.

Another innovative aspect of the subject matter described in this disclosure relates to a non-transitory computer-readable medium storing computer-executable code, including code for causing a processor in a user equipment to: receive a reference signal from a base station, wherein the reference signal is received within a frequency-time region that overlaps with a control channel frequency-time region; generate information related to a control channel between the UE and the base station based on the reference signal; and transmit the information to the base station.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 4A-4G show various examples of transmission of reference signals for characterizing a control channel between a base station and a user equipment (UE) in accordance with another aspect of the disclosure.

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G or 5G, or further implementations thereof, technology.

Figure 1:
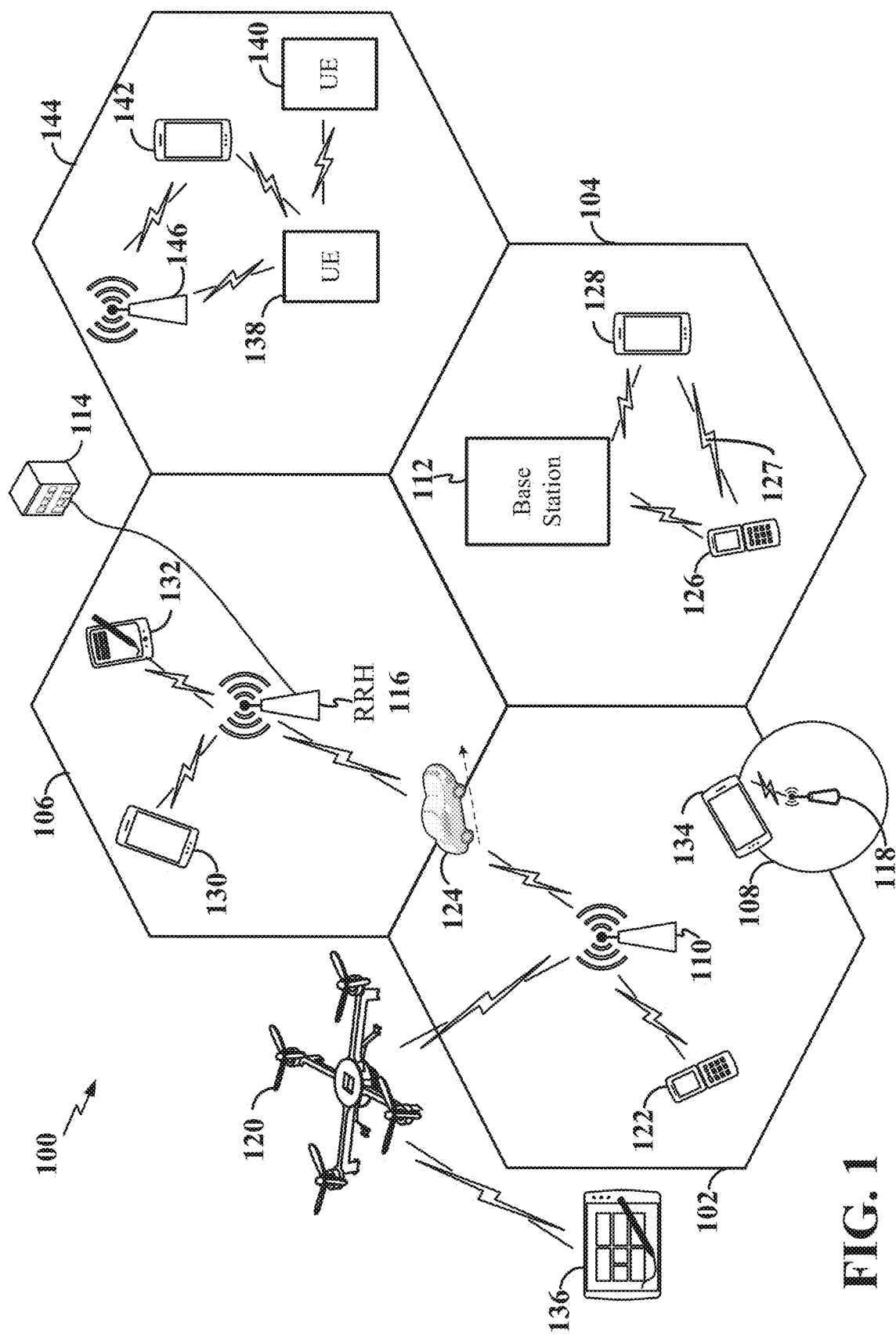
FIG. 1 shows a diagram of an example wireless radio access network in accordance with an aspect of the disclosure.

FIG. 1 shows a diagram of an example wireless radio access network 100 (e.g., a wireless communication system). The Radio Access Network (RAN) 100 may implement any suitable wireless communication technology or technologies to provide radio access. As one example, the RAN 100 may operate according to 3rd Generation Partnership Project (3GPP) New Radio (NR) specifications, often referred to as 5G NR. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the RAN 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio or communication link within a sector can be identified by a single logical identification belonging to that sector. In a cell that is divided into sectors, the multiple sectors within a cell can be formed by groups of antennas, with each antenna responsible for communication with UEs in a portion of the cell.

In general, a respective base station (BS) serves each cell. Broadly, a base station is a network element in a radio access network responsible for radio transmission and reception in one or more cells to or from a UE. A BS also may be referred to by those skilled in the art as a base transceiver station (BTS), a radio base station, a radio transceiver, a transceiver function, a basic service set (BSS), an extended service set (ESS), an access point (AP), a Node B (NB), an Evolved Node B (eNB), a Next Generation gNode B (gNB) or some other suitable terminology.

In FIG. 1, two base stations 110 and 112 are shown in cells 102 and 104, respectively; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (such as a microcell, picocell, femtocell, home base station, home Node B, home eNode B, etc.), which may overlap with one or more macrocells. In this example, the cell 108 may be referred to as a small cell, as the base station 118 supports a cell having a relatively small size. Cell sizing can be done according to system design as well as component constraints. It is understood that the radio access network 100 may include any number of wireless base stations and cells. Further, a relay node or UE may be deployed to extend the size or coverage area of a given cell, as well as provide diversity or aggregated communication links between a base station and a UE. The base stations 110, 112, 114, and 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120 (or other movable device).

In general, base stations may include a backhaul interface for communication with a backhaul portion (not shown) of the network. The backhaul may provide a link between a base station and a core network (not shown); and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as a user equipment (UE) in standards and specifications promulgated by the 3rd Generation Partnership Project (3GPP), but also may be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, such as corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer or wearable device, such as eyewear, a wearable camera, a virtual reality device, a smart watch, a health or fitness tracker, a digital audio player (such as MP3 player), a camera, a game console, etc.

A mobile apparatus may additionally be a digital home or smart home device such as a home audio, video, or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (such as a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, such as in terms of prioritized access for transport of critical service data, or relevant quality of service (QOS) for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In another example, a mobile network node (such as quadcopter 120) may be configured to function as a UE. For example, the quadcopter 120 may operate within cell 102 by communicating with base station 110.

Wireless communication between a RAN 100 and a UE (such as UE 122 or 124) may be described as utilizing an air interface. Transmissions over the air interface from a base station (such as base station 110) to one or more UEs (such as UE 122 and 124) may be referred to as downlink (DL) transmission. In accordance with certain aspects of the present disclosure, the term downlink may refer to a point-to-multipoint transmission originating at a scheduling entity (described further below; such as base station 110). Another way to describe this scheme may be to use the term broadcast channel multiplexing. Transmissions from a UE (such as UE 122) to a base station (such as base station 110) may be referred to as uplink (UL) transmission. In accordance with further aspects of the present disclosure, the term uplink may refer to a point-to-point transmission originating at a scheduled entity (described further below; such as UE 122).

For example, DL transmissions may include unicast or broadcast transmissions of control information or traffic information (such as user data traffic) from a base station (such as base station 110) to one or more UEs (such as UEs 122 and 124), while UL transmissions may include transmissions of control information or traffic information originating at a UE (such as UE 122). In addition, the uplink or downlink control information or traffic information may be time-divided into frames, subframes, slots, or symbols. As used herein, a resource element (RE) carries a symbol per subcarrier of an orthogonal frequency division multiplexed (OFDM) waveform. A slot may carry 7 or 14 OFDM symbols. A subframe may refer to a duration of 1ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, such as several times per slot.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells.

Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (such as unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and radio frame timing from the synchronization signals, and in response to deriving timing, transmit an uplink pilot or reference signal. The uplink pilot signal transmitted by a UE (such as UE 124) may be concurrently received by two or more cells (such as base stations 110 and 114/116) within the RAN 100. Each of the cells may measure a strength of the pilot signal, and the RAN (such as one or more of the base stations 110 and 114/116 or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum; the technical rules or limitations may be required to access the spectrum, but the spectrum may still be shared by multiple operators or multiple radio access technologies (RATs). For example, the holder of a license for a portion of licensed spectrum may provide licensed shared access (LSA) to share that spectrum with other parties, such as with suitable license-determined conditions to gain access.

In some examples, access to the air interface may be scheduled, a scheduling entity (such as a base station) allocates resources (such as time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (such as one or more other UEs). In this example, sidelink or other type of direct link signals may be communicated directly between UEs without relying on scheduling or control information from another entity, such as a base station. For example, UE 138 is illustrated communicating with UEs 140 and 142. In some examples, the UE 138 is functioning as a scheduling entity, while UEs 140 and 142 may function as scheduled entities. For example, UE 138 may function as a scheduling entity in a device-to-device (D2D), peer-to-peer (P2P), vehicle-to-everything (V2X), or in a mesh network. In a mesh network example, UEs 140 and 142 may optionally communicate directly with one another in addition to communicating with the scheduling entity 138.

In some other examples, two or more UEs (such as UEs 126 and 128) within the coverage area of a serving base station 112 may communicate with both the base station 112 using cellular signals and with each other using direct link (such as sidelink) signals 127 without relaying that communication through the base station. In an example of a V2X network within the coverage area of the base station 112, the base station 112 or one or both of the UEs 126 and 128 may function as scheduling entities to schedule sidelink communication between UEs 126 and 128.

The sidelink communication 127 between UEs 126 and 128 or between UEs 138, 140, and 142 may occur over a proximity service (ProSe) PC5 interface. ProSe communication may support different operational scenarios, such as in-coverage, out-of-coverage, and partial coverage. Out-of-coverage refers to a scenario in which UEs (such as UEs 138, 140 and 142) are outside the coverage are of a base station (such as base station 146), but each are still configured for ProSe communication. Partial coverage refers to a scenario in which a UE is outside the coverage area of a base station, while one or more other UEs in communication with the UE are in the coverage area of a base station. In-coverage refers to a scenario in which UEs (such as UEs 126 and 128) are in communication with a base station (such as base station 112) via a Uu (such as a cellular interface) connection to receive ProSe service authorization and provisioning information to support ProSe operation.

Various aspects of the present disclosure will be described with reference to an OFDM waveform, schematically illustrated in FIG. 2. It may be understood by those of ordinary skill in the art that the various aspects of the present disclosure may be applied to an SC-FDMA waveform in substantially the same way as described herein below. That is, while some examples of the present disclosure may focus on an OFDM link for clarity, it may be understood that the same principles may be applied as well to SC-FDMA waveforms.

Figure 2:
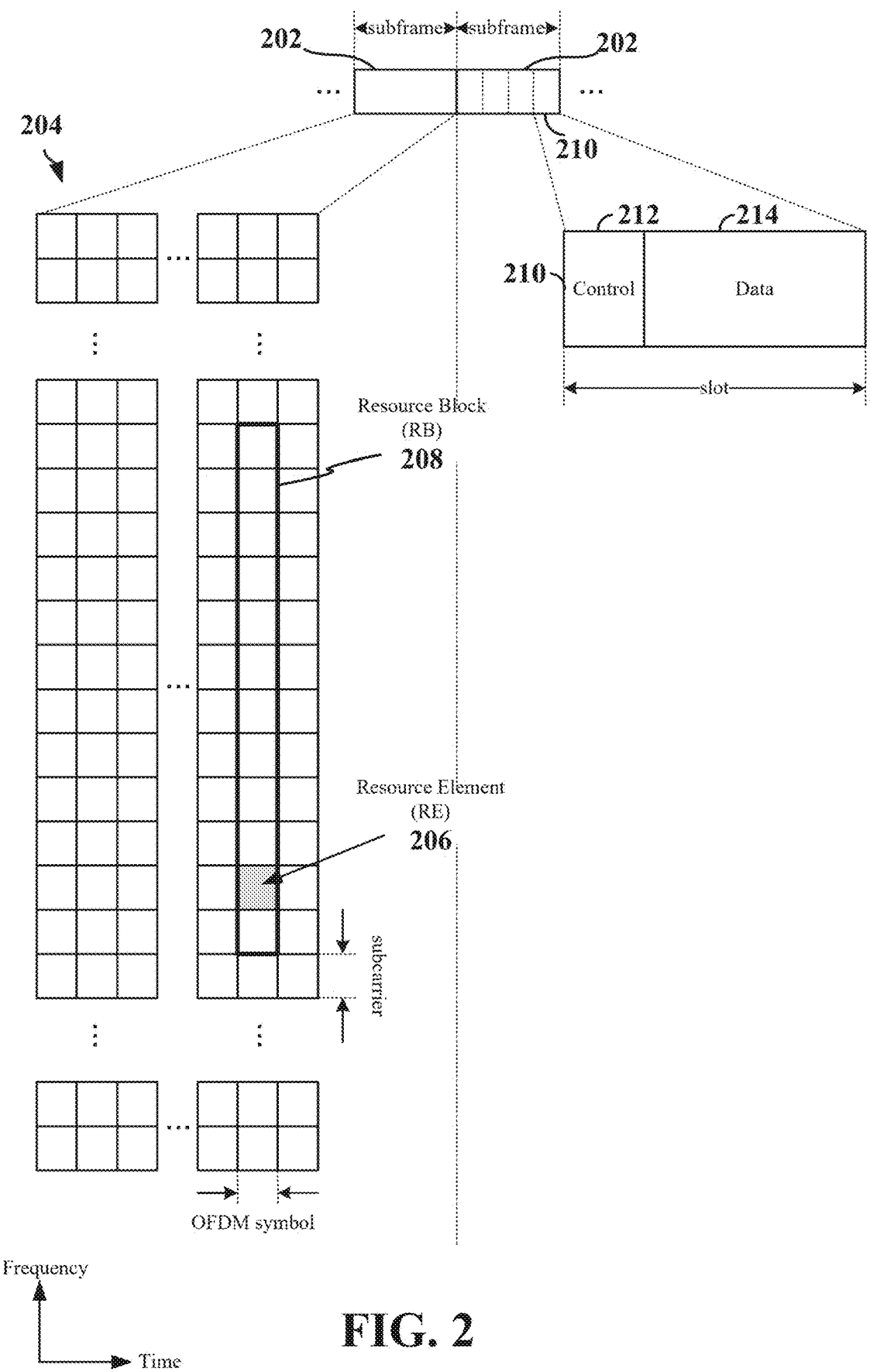
FIG. 2 shows a diagram of an example organization of wireless communication link resources in an air interface utilizing orthogonal frequency divisional multiplexing (OFDM) in accordance with another aspect of the disclosure.

FIG. 2 shows a diagram of an example organization of wireless communication link resources in an air interface utilizing orthogonal frequency divisional multiplexing (OFDM). An expanded view of an example subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. A RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

Scheduling of UEs devices for downlink, uplink, or sidelink transmissions typically involves scheduling one or more resource elements 206 within one or more sub-bands. Thus, a UE device generally utilizes only a subset of the resource grid 204. In some examples, an RB may be the smallest unit of resources that can be allocated to a UE device. Thus, the more RBs scheduled for a UE device, and the higher the modulation scheme chosen for the air interface, the higher the data rate for the UE device. The RBs may be scheduled by a base station (such as gNB, eNB, roadside unit (RSU), etc.) or may be self-scheduled by a UE implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 millisecond (ms) subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (such as one to three OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The simple structure illustrated in FIG. 2 is merely example in nature, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 also may carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control or data channels within the RB 208.

In some examples, the slot 210 may be utilized for broadcast or unicast communication. In V2X or D2D networks, a broadcast communication may refer to a point-to-multipoint transmission by a one device (such as a vehicle, base station (such as RSU, gNB, eNB, etc.). UE, or other similar device) to other devices. A unicast communication may refer to a point-to-point transmission by a one device to a single other device.

In an example of cellular communication over a cellular carrier via a Uu interface, for a DL transmission, the scheduling entity (such as a base station) may allocate one or more REs 206 (such as within the control region 212 of the slot 210) to carry DL control information including one or more DL control channels, such as an SSB (synchronization signal block), PDCCH, etc. to one or more scheduled entities (such as UEs), which may include one or more sidelink devices (such as V2X/D2D devices). The PDCCH carries downlink control information (DCI) including, for example, scheduling information that provides a grant, or an assignment of REs for DL and UL transmissions.

In an UL transmission over the Uu interface, the scheduled entity may utilize one or more REs 206 to carry UL control information (UCI) including one or more UL control channels, such as a physical uplink control channel (PUCCH), to the scheduling entity. UCI may include, for example, pilots, reference signal, and information to enable or assist in decoding uplink data transmissions. In some examples, the UCI may include a scheduling request (SR), i.e., request for the scheduling entity to schedule uplink transmissions.

In addition to control information, one or more REs 206 (such as within the data region 214) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 206 may be configured to carry system information blocks (SIBs), carrying information that may enable access to a given cell.

In an example of sidelink communication over a sidelink carrier via a PC5 interface, the control region 212 of the slot may include control information transmitted by sidelink devices over the sidelink channel, while the data region 214 of the slot 210 may include data transmitted by sidelink devices over the sidelink channel. In some examples, the control information may be transmitted within sidelink control information (SCI) over a physical sidelink control channel (PSCCH), while the data may be transmitted within a physical sidelink shared channel (PSSCH). For in-coverage or partial-coverage scenarios, the DCI transmitted by the base station over the Uu interface may include scheduling information indicating one or more resource blocks within the control region 212 or data region 214 allocated to sidelink devices for sidelink communication.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
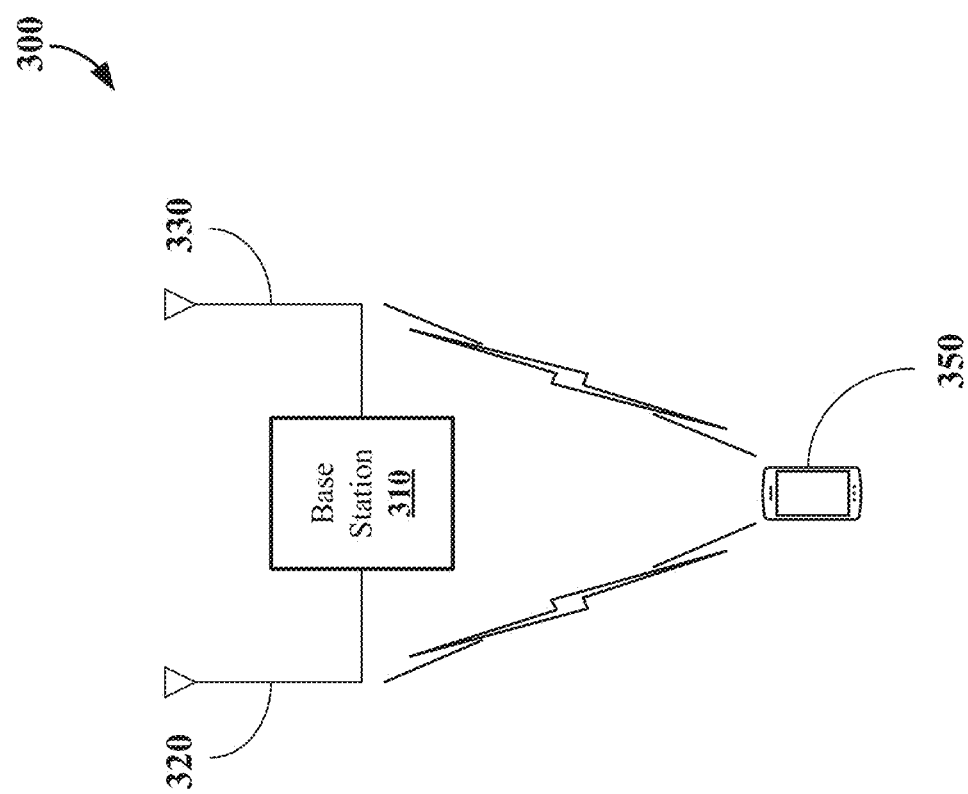
FIG. 3 shows an example wireless communication system in accordance with another aspect of the disclosure.

FIG. 3 shows an example wireless communication system 300 in accordance with another aspect of the disclosure. The wireless communication system 300 includes a base station 310 including a set of antennas or transmission ports 320 and 330 at different locations, and a user equipment (UE) 350. In a downlink transmission, the base station 310 sends control information and traffic data to the UE 350 via a physical downlink control channel (PDCCH) and a physical downlink shared channel (PDSCH), respectively. In an uplink transmission, the UE 350 sends control information and traffic data to the base station via a physical uplink control channel (PUCCH) and a physical uplink shared channel (PUSCH), respectively.

In some wireless communication system 300, the base station 310 sends one or more reference signals (e.g., channel state information-reference signal (CSI-RS) and demodulation reference signal (DMRS)) to the UE 350 for the UE 350 to characterized the data channel (PDSCH) between the base station 310 and the UE. In response to the one or more reference signals, the UE 350 determines some metrics that characterize the PDSCH. These metrics include channel quality indicator (CQI), signal-to-interference-plus-noise ratio (SINR), reference signal received power (RSRP), reference signal received quality (RSRQ), received signal strength indication (RSSI), and/or others.

The UE 350 then transmits information regarding the data channel metrics to the base station 310. The base station 310 uses the information to adapt the PDSCH transmission for the UE 350, such as determine the size of the data blocks, the error correction coding rate or parameter (e.g., low density parity check (LDPC) code rate), the symbol modulation (e.g., binary phase-shift keying (BPSK), quadrature phase-shift keying (QPSK), quadrature amplitude modulation (QAM), and others), and beamforming configuration. For example, if the metrics indicates a relatively good channel, the base station 310 may configure the PDSCH transmission with relatively large data block size, high rate error correction coding, and high rate modulation schemes. Similarly, if the metrics indicates a relatively bad channel, the base station 310 may configure the PDSCH transmission with relatively small data block size, low rate error correction coding, and low rate modulation schemes.

However, in the past, there has been an absence of such channel measurement and reporting related to the control channel or the PDCCH. For certain wireless communication application, channel measurement and reporting for the PDCCH may be sufficiently inferred from a long-term basis on the channel metrics associated with the PDSCH. But, for other applications, such as high-reliability and low latency applications, as in the case of ultra-reliable low-latency communication (URLLC) (e.g., factory automation, autonomous driving, industrial internet, etc.), PDCCH channel metrics inference from the PDSCH channel metrics may not be suitable because of the inaccuracy and the need for relatively fast PDCCH adaptation for low latency applications. As an example, if the PDCCH is experiencing fading or interference, the base station has to react fast to the fading to properly adapt (e.g., setting the aggregation level for) the PDCCH. Thus, there is motivation for the UE 350 to provide channel metrics for the PDCCH to the base station 310.

FIG. 4A shows a diagram of an example frequency-time transmission slot 400 transmitted by the base station 310 to the UE 350 in accordance with another aspect of the disclosure. The y- or vertical-axis of the diagram represents the frequency domain. The x- or horizontal axis of the diagram represents the time domain.

As the diagram illustrates, the transmission slot 400 is transmitted in the frequency domain across a channel bandwidth part (BWP). The transmission slot 400 includes a control channel frequency-time region 402 (represented as the lighter-shaded region), which is referred to in 5G NR as a control resource set (CORESET) or in LTE as a control region. A CORESET is a frequency-time region of a transmission slot reserved for control information, such as downlink control information (DCI), for scheduling other frequency-time regions, such as resource blocks (RBs), in the transmission slot that contain data for specific UEs. In the time domain, the control channel frequency-time region 402 is typically situated within the first and second OFDM symbol periods of the transmission slot 400. In the frequency domain, the control channel frequency-time region 402 is situated within the channel bandwidth part (BWP) of the transmission slot 400. The remaining OFDM symbols of the transmission slot 400 may include other information, such as the traffic data in the PDSCH and others.

For characterizing the control channel region between the UE 350 and the base station 310, the transmission slot 400 includes a dedicated channel state information-reference signal (CSI-RS) 404 (represented as the darker-shaded region) within a frequency-time region that overlaps with control channel frequency-time region 402. The UE 350 receiving the transmission slot 400 may process the CSI-RS 404 to generate channel metrics related to the control channel region 402, as the CSI-RS 404 overlaps the control channel region 402 in the frequency and time domains. In this example, the CSI-RS 404 extends in the frequency domain substantially across the entire channel bandwidth part (BPW). However, it shall be understood that the CSI-RS 404 may extend only across the bandwidth of the control channel region 402. The UE 350 tsends the information (e.g., a channel state information (CSI) feedback report) regarding the channel metrics to the base station 310, which adapts subsequent transmissions of the PDCCH signal based on the information, as previously discussed.

FIG. 4B shows a diagram of another example frequency-time transmission slot 410 transmitted by the base station 310 to the UE 350 in accordance with another aspect of the disclosure. Similarly, the y- or vertical-axis of the diagram represents the frequency domain, and the x- or horizontal axis of the diagram represents the time domain.

As the diagram illustrates, the transmission slot 410 is transmitted in the frequency domain across a channel bandwidth part (BWP). The transmission slot 410 includes a control channel frequency-time region 402 (represented as the lightest-shaded region), which is referred to in 5G NR as a control resource set (CORESET) or in LTE as a control region. In the time domain, the control channel frequency-time region 412 is typically situated within the first and second OFDM symbol periods of the transmission slot 410. In the frequency domain, the control channel frequency-time region 412 is situated within the channel bandwidth part (BWP) of the transmission slot 410. The remaining OFDM symbols of the transmission slot 410 may include other information, such as the traffic data in the PDSCH and others.

In this example, the control channel frequency-time region 412 includes a PDCCH 414 (represented as a medium-shaded region) including control data (e.g., downlink control information (DCI)) for the UE 350. For characterizing the PDCCH 414 between the UE 350 and the base station 310, the PDCCH 414 includes an embedded demodulation reference signal (DMRS) 416 (represented as the darkest-shaded region) that also overlaps with control channel frequency-time region 412 as the PDCCH 414 is within the region 412. The UE 350 receiving the transmission slot 410 estimates the channel based on the DMRS 416, and then decodes the PDCCH 414 based on the channel estimates. The UE 350 also generates channel metrics related to the PDCCH 414 based on the DMRS 416. As illustrated, the DMRS 416 may extend in the frequency domain substantially across the bandwidth of the PDCCH 414. The UE 350 sends the CSI feedback information or report regarding the channel metrics to the base station 310, which adapts subsequent transmissions of the PDCCH signal based on the information, as previously discussed.

FIG. 4C shows a diagram of another example frequency-time transmission slot 420 transmitted by the base station 310 to the UE 350 in accordance with another aspect of the disclosure. Similarly, the y- or vertical-axis of the diagram represents the frequency domain, and the x- or horizontal axis of the diagram represents the time domain.

As the diagram illustrates, the transmission slot 420 is transmitted in the frequency domain across a channel bandwidth part (BWP). The transmission slot 420 includes a control channel frequency-time region 422 (represented as the lightest-shaded region), which is referred to in 5G NR as a control resource set (CORESET) or in LTE as a control region. In the time domain, the control channel frequency-time region 422 is typically situated within the first and second OFDM symbol periods of the transmission slot 420. In the frequency domain, the control channel frequency-time region 422 is situated within the channel bandwidth part (BWP) of the transmission slot 420. The remaining OFDM symbols of the transmission slot 420 may include other information, such as the traffic data in the PDSCH and others.

In this example, the control channel frequency-time region 422 includes a PDCCH 424 (represented as a medium-shaded region) including control data (e.g., downlink control information (DCI)) for the UE 350. For characterizing the PDCCH 424 between the UE 350 and the base station 310, the control channel region 422 includes a wideband demodulation reference signal (DMRS) 416 (represented as the darkest-shaded region) that may extend the bandwidth of the control channel frequency-time region 422, and has a bandwidth larger than the bandwidth of the PDCCH 424. The UE 350 receiving the transmission slot 420 performs channel estimation based on the wideband DMRS 426 and decodes the PDCCH 424 based on the channel estimates. The UE 350 also generates channel metrics related to the PDCCH 424 based on the wideband DMRS 426, as the wideband DMRS 426 overlaps with the PDCCH 424 in the frequency and time domains. The UE 350 then sends the CSI feedback information or report regarding the channel metrics to the base station 310, which adapts subsequent transmissions of the PDCCH signal based on the information, as previously discussed.

In terms of the control channel metrics information, the information sent by the UE 350 to the base station 310 may include an absolute value of a channel quality indicator (CQI) related to the PDCCH or the CORESET, depending on the bandwidth of the reference signal. In this regard, the CQI reflects the observed SINR associated with the PDCCH or the CORESET. Alternatively, the control channel metrics information may include a difference between a first channel quality indicator (CQI) associated with the PDCCH or CORESET and a second channel quality indicator (CQI) associated with a data channel or PDSCH between the UE 350 and the base station 310. As the UE 350 may already perform channel measurements for the PDSCH, sending the difference or delta to the base station 310 may reduce the amount of data sent to the base station 310 while conveying the same information regarding the channel metrics for the control channel.

Alternatively, the control channel metrics information may include a recommended PDCCH aggregation level (number of resource blocks (RBs) used for transmitting the PDCCH signal). For example, if the channel is relatively good (e.g., little fading and interference), the recommended PDCCH aggregation level may be relatively small (less RBs) as the control information may be successfully received in relatively good channel conditions. If, on the other hand, the channel is relatively poor (e.g., high level of fading and interference), the recommended PDCCH aggregation level may be relatively large (more RBs) to improve the successful reception of the control information by the UE 350. Thus, the recommended PDCCH aggregation level may vary inversely to the channel quality over the bandwidth in which the measurement was taken, such as across the channel bandwidth part (BWP), across the bandwidth of the CORESET or control region, across the bandwidth of specified resource element groups (REGs) within the CORESET or control region, etc.

It shall be understood that the control channel metrics information may be in any combination of the above, such as the absolute CQI, the difference between control channel CQI and the data channel CQI, and the aggregation level.

In terms of the information, the feedback report may be based on a wideband single report per bandwidth part (BWP). Or, the feedback report may be based on one or more CORESETs. Alternatively, the feedback report may be based on a set of resource element groups (REGs) within a CORESET. The latter two alternatives are discussed further herein with reference to FIGS. 4D-4E.

FIG. 4D shows a diagram of another example frequency-time transmission slot 430 transmitted by the base station 310 to the UE 350 in accordance with another aspect of the disclosure. Similarly, the y- or vertical-axis of the diagram represents the frequency domain, and the x- or horizontal axis of the diagram represents the time domain.

As the diagram illustrates, the transmission slot 430 is transmitted in the frequency domain across a channel bandwidth part (BPW). The transmission slot 430 includes a set of control channel frequency-time regions 432 and 442 (represented as the lightest-shaded regions), which is referred to in 5G NR as control resource sets (CORESETs) or in LTE as control regions. In the time domain, the control channel frequency-time regions 432 and 442 are typically situated within the first several OFDM symbol periods of the transmission slot 430. In the frequency domain, the control channel frequency-time regions 432 and 442 are situated within the channel bandwidth part (BWP) of the transmission slot 430. The remaining OFDM symbols of the transmission slot 430 may include other information, such as the traffic data in the PDSCH and others.

In this example, the control channel frequency-time region 432 includes a set of one or more resource element regions (REGs) 434 (represented as a medium-shaded region), and the control channel frequency-time region 442 includes a set of one or more resource element regions (REGs) 444. The purpose of the REGs 444, in this context, is to provide control channel metrics (e.g., CQIs) for localized regions in the control region 442 to improve the frequency-time resolution of the control channel metrics. For characterizing the control REGs 434 and 444 between the UE 350 and the base station 310, the control channel regions 432 and 442 include reference signals 436 and 446 (represented as the darkest-shaded region) that may extend across the bandwidth of the control channel frequency-time regions 432 and 442, respectively (i.e., larger than the bandwidths of the REGs 434 and 444). The UE 350 receiving the transmission slot 430 may process the reference signals 436 and 446 to generate channel metrics related to the control REGs 434 and 444, respectively. The UE 350 then sends the CSI feedback information or report regarding the channel metrics to the base station 310, which adapts subsequent transmissions of the PDCCH signal based on the information, as previously discussed. For example, the base station 310 may choose one of the REGs 434 and 444 to transmit the PDCCH for the UE 350 based on the information. The number of REGs that are characterized may be determined by the network; accordingly, the base station 310 may provide such parameter to the UE 350 via, for example, a radio resource control (RRC) message.

FIG. 4E shows a diagram of another example frequency-time transmission slot 450 transmitted by the base station 310 to the UE 350 in accordance with another aspect of the disclosure. Similarly, the y- or vertical-axis of the diagram represents the frequency domain, and the x- or horizontal axis of the diagram represents the time domain.

As the diagram illustrates, the transmission slot 450 is transmitted in the frequency domain across a channel bandwidth part (BWP). The transmission slot 450 includes a control channel frequency-time region 452 (represented as the lightest-shaded region), which is referred to in 5G NR as a control resource set (CORESET) or in LTE as a control region. In the time domain, the control channel frequency-time region 452 is typically situated within the first and second OFDM symbol periods of the transmission slot 450. In the frequency domain, the control channel frequency-time region 452 is situated within the channel bandwidth part (BWP) of the transmission slot 450. The remaining OFDM symbols of the transmission slot 450 may include other information, such as the traffic data in the PDSCH and others.

In this example, the control channel frequency-time region 452 includes a set of resource element regions (REGs) 454 and 456 (represented as medium-shaded regions. For characterizing the control REGs 454 and 456 between the UE 350 and the base station 310, the control channel region 452 includes a reference signal 458 (represented as the darkest-shaded region) that may extend the bandwidth of the control channel frequency-time region 452 (e.g., larger than the bandwidths of the REGs 454 and 456). The UE 350 receiving the transmission slot 450 may process the reference signal 458 to generate channel metrics related to the control REGs 454 and 456, respectively. The UE 350 then sends the CSI feedback information or report regarding the channel metrics to the base station 310, which adapts subsequent transmissions of the PDCCH signal based on the information, as previously discussed. For example, the base station 310 may choose one of the REGs 454 and 456 to transmit the PDCCH for the UE 350 based on the information. Similarly, the number of REGs to characterized may be determined by the network; accordingly, the base station 310 may provide such parameter to the UE 350 via, for example, a radio resource control (RRC) message.

FIG. 4F shows a diagram of another example frequency-time transmission slot 460 transmitted by the base station 310 to the UE 350 in accordance with another aspect of the disclosure. Similarly, the y- or vertical-axis of the diagram represents the frequency domain, and the x- or horizontal axis of the diagram represents the time domain.

As the diagram illustrates, the transmission slot 460 is transmitted in the frequency domain across a channel bandwidth part (BWP). The transmission slot 460 includes a control channel frequency-time region 462 (represented as the lighter-shaded region), which is referred to in 5G NR as a control resource set (CORESET) or in LTE as a control region. In the time domain, the control channel frequency-time region 462 is typically situated within the first and second OFDM symbol periods of the transmission slot 460. In the frequency domain, the control channel frequency-time region 462 is situated within the channel bandwidth part (BWP) of the transmission slot 460. The remaining OFDM symbols of the transmission slot 460 may include other information, such as the traffic data in the PDSCH and others.

In this example, the control channel frequency-time region 462 includes two reference signals 464 and 466 (represented as the darker-shaded region) transmitted by the two different ports or antennas or transmission panels 320 and 330, which is associated with different CORESET-poolIndex and/or different TCI states in the TCI codepoints configuration, of the base station 310. Since the ports or antennas 320 and 330 are situated in different locations, the control channels between the antennas 320 and 330 and the UE 350 may be different. Thus, the technique herein facilitates the base station 310 in selecting which port or antenna 320 or 330 to transmit the PDCCH signal. The different ports or antennas 320 and 330 of the base station 310 may be identified by different transmission configuration indicator (TCI) states (e.g., TCI state 1 for port 320, and TCI state 2 for port 330). The UE 350 receiving the transmission slot 460 may process the reference signals 464 and 466 to generate channel metrics related to the control channel region 462 associated with the different transmission ports 320 and 330, respectively. The UE 350 then sends the CSI feedback information or report regarding the channel metrics to the base station 310, which adapts subsequent transmissions of the PDCCH signal based on the information, as previously discussed. For example, the base station 310 may choose one of the transmission ports 320 and 330 to transmit the PDCCH for the UE 350 based on the information. Alternatively, the UE 350 may select the transmission port 320 or 330 based on the reference signals 464 and 466; in such case, the information transmitted by the UE 350 to the base station 310 is the selection.

FIG. 4G shows a diagram of another example frequency-time transmission slot 470 transmitted by the base station 310 to the UE 350 in accordance with another aspect of the disclosure. Similarly, the y- or vertical-axis of the diagram represents the frequency domain, and the x- or horizontal axis of the diagram represents the time domain.

As the diagram illustrates, the transmission slot 470 is transmitted in the frequency domain across a channel bandwidth part (BPW). The transmission slot 470 includes a control channel frequency-time region 472 (represented as the lighter-shaded region), which is referred to in 5G NR as a control resource set (CORESET) or in LTE as a control region. In the time domain, the control channel frequency-time region 472 is typically situated within the first and second OFDM symbol periods of the transmission slot 470. In the frequency domain, the control channel frequency-time region 472 is situated within the channel bandwidth part (BWP) of the transmission slot 470. The remaining OFDM symbols of the transmission slot 470 may include other information, such as the traffic data in the PDSCH and others.

In this example, the control channel frequency-time region 472 includes two reference signals 474 and 476 (represented as the darker-shaded region) transmitted by the base station 310 in a multiple-input-multiple-output (MIMO) manner using different precoding matrices, respectively. In this example, the precoding is transparent to the specification; meaning that the selected precoding of the PDCCH DMRS will be the same as the precoding of the PDCCH that follows. The UE 350 receiving the transmission slot 470 may process the reference signals 474 and 476 to generate channel metrics related to the control channel region 472 associated with the different MIMO precoding matrices, respectively. The UE 350 then sends the CSI feedback information or report regarding the channel metrics to the base station 310, which adapts subsequent transmissions of the PDCCH signal based on the information, as previously discussed. For example, the base station 310 may choose one of the precoding matrices to transmit the PDCCH for the UE 350 based on the information. Alternatively, the UE 350 may select the precoding matrix by providing an index identifying the corresponding reference signal 474 or 476 to the base station 310.

In the case of the reference signals 464 and 466 from different ports or antennas, and the case of the reference signals 474 and 476 coded with different precoding matrices, it may be more suitable for the reference signals to be close to each other in the frequency and time domains. This is so that the reference signals 464/466 and 474/476 accurately reflect the differences due to different ports/antennas and different precoding matrices, respectively. If these reference signals are significantly apart in the frequency domain or time domain, the differences in the reference signals may be due to other conditions, such as channel fading or dynamic channel conditions, such as interference occurring during the transmission of one of the reference signals and not during the other.

In terms of content, the CSI feedback information may be a single report including channel metrics for the entire BWP, a set of one or more reports including channel metrics for a set of one or more CORESETs, respectively, a set of one or more reports including channel metrics for a set of one or more REGs (wherein the set of one or more REGs may be configured via an RRC message).

Figure 5:
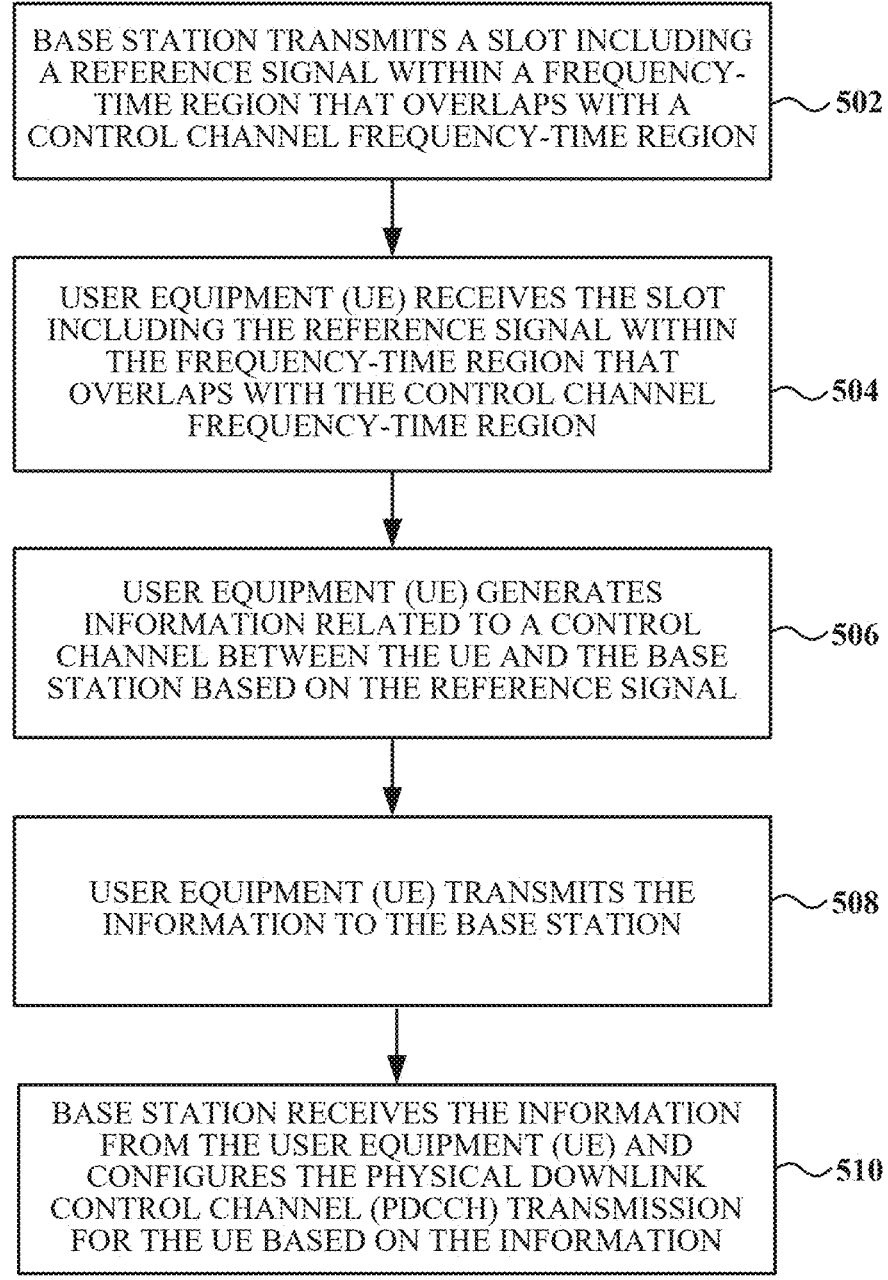
FIG. 5 shows an example flowchart of a method for characterizing a control channel between a base station and user equipment (UE) and configuring a physical downlink control channel (PDCCH) based on the channel characterization in accordance with another aspect of the disclosure.

FIG. 5 shows an example flowchart of a method 500 for characterizing a control channel between a base station and user equipment (UE) and configuring a physical downlink control channel (PDCCH) based on the channel characterization in accordance with another aspect of the disclosure.

According to the method 500, the base station transmits a slot including a reference signal within a frequency-time region that overlaps with a control channel frequency-time region (block 502). The method 500 further includes a user equipment (UE) receiving the slot including the reference signal within the frequency-time region that overlaps with the control channel frequency-time region (block 504).

The method 500 additionally includes the user equipment (UE) generating information related to a control channel between the UE and the base station based on the reference signal (block 506). The method 500 also includes the user equipment (UE) transmitting the information to the base station (block 508). Further, the method 500 includes the base station receiving the information from the user equipment (UE) and configuring the physical downlink control channel (PDCCH) transmission for the UE based on the information (block 510).

As discussed, the information may include the CQI, a difference or delta between the $CQI_C$ associated with the control channel and the $CQI_D$ associated with the data channel, the recommended aggregation level, the CQI associated with a first TCI or precoding matrix, the CQI associated with a second TCI or precoding matrix, or the selected TCI or precoding matrix.

Figure 6:
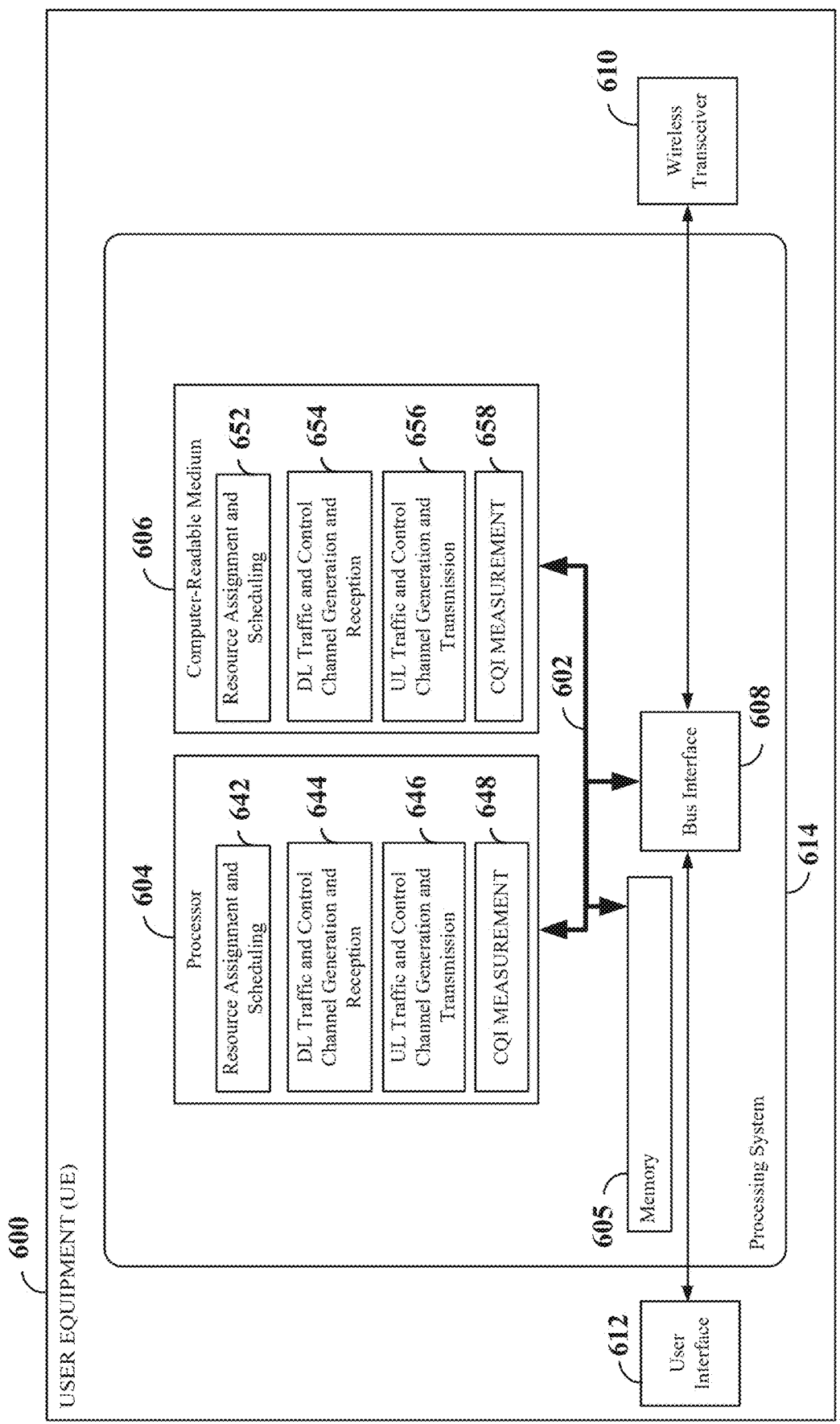
FIG. 6 shows a block diagram of an example hardware implementation of a user equipment (UE) in accordance with another aspect of the disclosure.

FIG. 6 shows a block diagram of an example hardware implementation of a user equipment (UE) 600. The UE 600 is depicted employing a processing system 614. For example, the UE 600 may correspond to any of the UEs previously discussed herein, such as UE 350.

The UE 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 600 may be configured to perform any one or more of the functions described herein. That is, the processor 604, as utilized in the UE 600, may be used to implement any one or more of the processes and procedures described below.

In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors (represented generally by the processor 604), a memory 605, and computer-readable media (represented generally by the computer-readable medium 606). The bus 602 also may link various other circuits such as timing sources, peripherals, voltage regulators, and power management circuits, which are well known in the art, and therefore, will not be described any further.

A bus interface 608 provides an interface between the bus 602 and a wireless transceiver 610. The wireless transceiver 610 allows for the UE 600 to communicate with various other apparatus over a transmission medium (such as air interface). Depending upon the nature of the apparatus, a user interface 612 (such as keypad, display, touch screen, speaker, microphone, control knobs, etc.) also may be provided. Of course, such a user interface 612 is optional, and may be omitted in some examples.

The processor 604 is responsible for managing the bus 602 and general processing, including the execution of software stored on the computer-readable medium 606. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 604, causes the processing system 614 to perform the various functions described below for any particular apparatus. The computer-readable medium 606 and the memory 605 also may be used for storing data that is manipulated by the processor 604 when executing software.

The computer-readable medium 606 may be a non-transitory computer-readable medium. A non-transitory computer-readable medium includes, by way of example, a magnetic storage device (such as hard disk, floppy disk, magnetic strip), an optical disk (such as a compact disc (CD) or a digital versatile disc (DVD)), a smart card, a flash memory device (such as a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. In some examples, the computer-readable medium 606 may be part of the memory 605. Those skilled in the art will recognize how best to implement the described functionality presented throughout this disclosure depending on the particular application and the overall design constraints imposed on the overall system.

In some aspects of the disclosure, the processor 604 may include circuitry configured for various functions. For example, the processor 604 may include resource assignment and scheduling circuitry 642 configured to assign resources and scheduling for signaling radio bearers (SRBs) and data radio bearers (DRBs) with base stations. The resource assignment and scheduling circuitry 642 may further be configured to execute resource assignment and scheduling software 652 stored in the computer-readable medium 606 to implement one or more of the functions described herein.

The processor 604 further includes DL traffic and control generation and reception circuitry 644 for receiving DL signaling and data from base stations. For example, with regard to wireless communication system 300, the DL traffic and control generation and reception circuitry 644 of UE 350 would control the reception of DL signaling and data from the base station 310. The DL traffic and control channel and reception circuitry 644 may further be configured to execute DL traffic and control channel reception processing software 654 stored in the computer-readable medium 606 to implement one or more of the functions described herein.

The processor 604 may further include uplink (UL) traffic and control channel reception and processing circuitry 646, configured to process and transmit uplink control channel signaling and uplink traffic data to one or more base stations. For example, the UL traffic and control channel reception and processing circuitry 646 may be configured to transmit uplink control information (UCI) or uplink user data traffic to the base station 310. The UL traffic and control channel reception and processing circuitry 646 may further be configured to execute UL traffic and control channel reception and processing software 656 stored in the computer-readable medium 606 to implement one or more of the functions described herein.

The processor 604 may further include channel quality indicator (CQI) measurement processing circuitry 686, configured to process reference signals received from base station to determine channel metrics related to control channels, such as the PDCCH. For example, the CQI measurement processing circuitry 648 may generate channel metrics information related to the PDCCH, and provide the information to the UL traffic and control channel reception and processing circuitry 646. The UL traffic and control channel reception and processing circuitry 646 may be configured to transmit the control channel metrics information (UCD to the base station 310. The CQI measurement processing circuitry 648 may further be configured to execute CQI measurement processing software 658 stored in the computer-readable medium 606 to implement one or more of the functions described herein.

Figure 7:
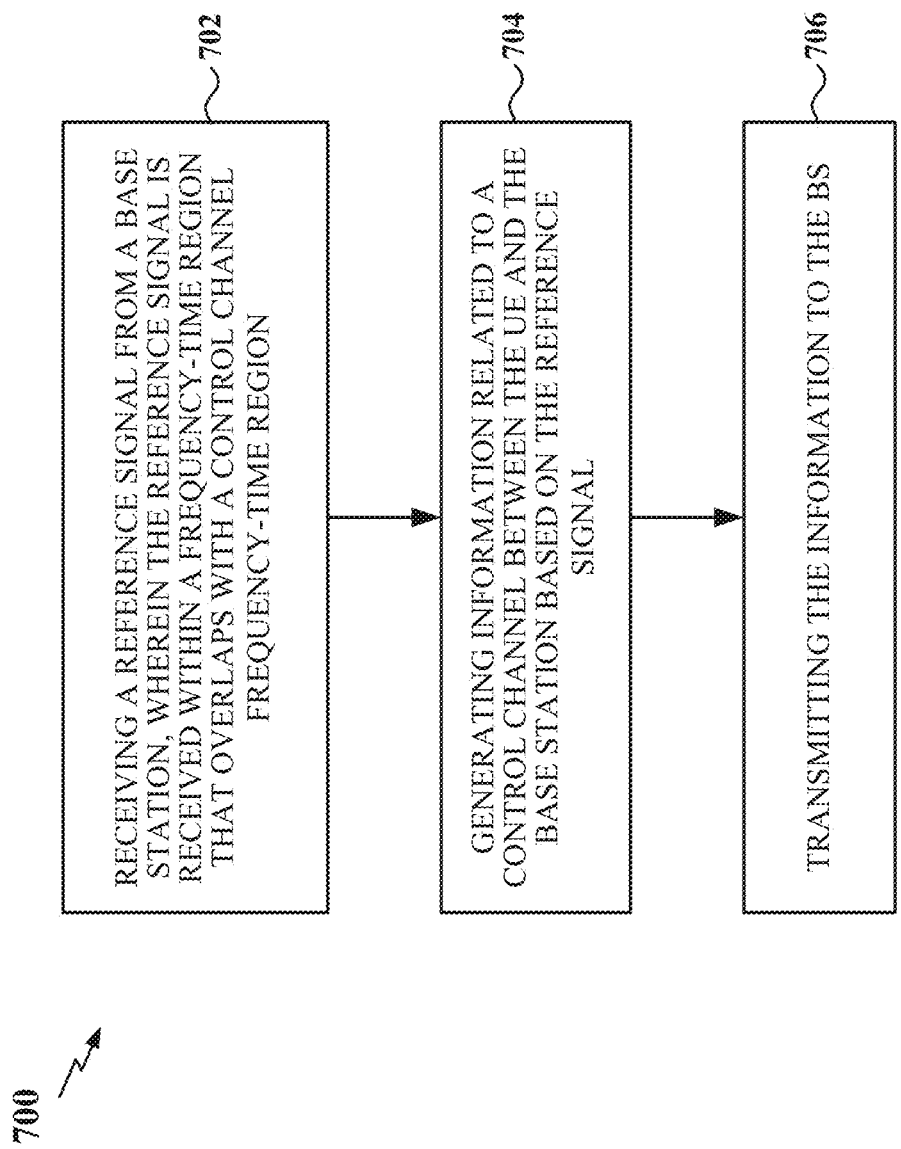
FIG. 7 shows an example flowchart of a method, implemented by the user equipment (UE) of FIG. 6, for characterizing a control channel between a base station and user equipment (UE) and reporting the characterization of the control channel to the base station in accordance with another aspect of the disclosure.

FIG. 7 shows an example flowchart of a method 700, implemented by the user equipment (UE) 600, for characterizing a control channel between a base station and user equipment (UE) and reporting the characterization of the control channel to the base station in accordance with another aspect of the disclosure. The method 700 includes the processor 604, using the DL traffic and control channel generation and reception circuitry 644 executing the DL traffic and control channel generation and reception software 654, to receive a reference signal from a base station via the wireless transceiver 610, wherein the reference signal is received within a frequency-time region that overlaps with a control channel frequency-time region via the wireless transceiver 610 (block 702). The method 700 further includes the processor 604, using the CQI measurement processing circuitry 648 executing the CQI measurement processing software 658, to generate information related to a control channel between the UE and the base station based on the reference signal (block 704). The method 700 further includes the processor 604, using the UL traffic and control generation and transmission circuitry 646 executing the UL traffic and control generation and transmission software 658, to transmit the information to the base station via the wireless transceiver 610 (block 706).

Figure 8:
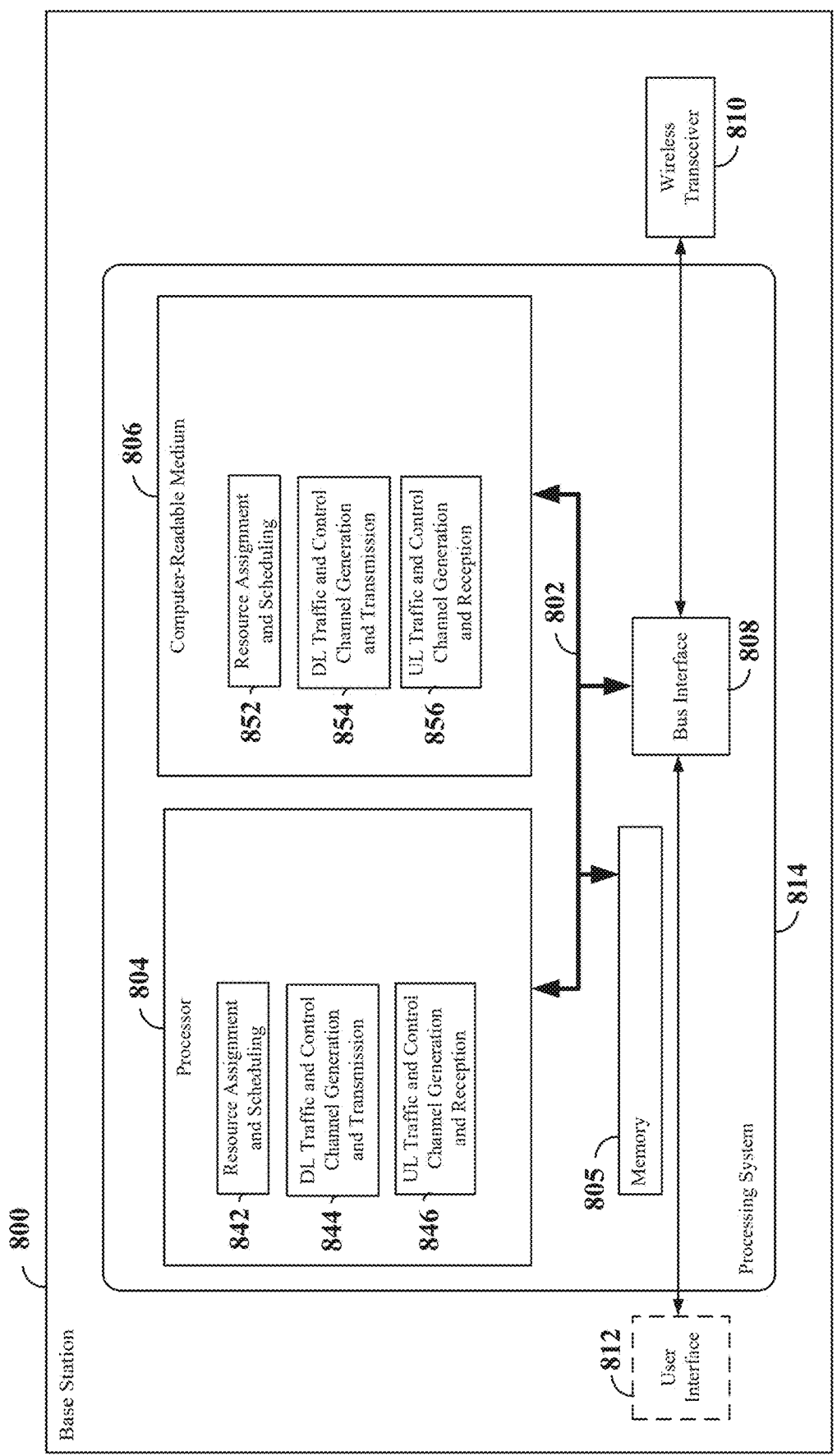
FIG. 8 shows a block diagram of an example hardware implementation of a base station in accordance with another aspect of the disclosure.

FIG. 8 shows a block diagram of an example hardware implementation of a base station 800. The base station 800 is depicted employing a processing system 814. For example, the base station 800 may correspond to any of the base stations previously discussed herein, such as the base station 310.

The base station 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station device 800 may be configured to perform any one or more of the functions described herein. That is, the processor 804, as utilized in the base station 800, may be used to implement any one or more of the processes and procedures described below.

In this example, the processing system 814 may be implemented with a bus architecture, represented generally by the bus 802. The bus 802 may include any number of interconnecting buses and bridges depending on the specific application of the processing system 814 and the overall design constraints. The bus 802 links together various circuits including one or more processors (represented generally by the processor 804), a memory 805, and computer-readable media (represented generally by the computer-readable medium 806). The bus 802 also may link various other circuits such as timing sources, peripherals, voltage regulators, and power management circuits.

A bus interface 808 provides an interface between the bus 802 and a wireless transceiver 810 and a backhaul link interface 811. The wireless transceiver 810 allows for the base station 800 to communicate with various other apparatus over a transmission medium (such as air interface). The backhaul link interface 811 allows for the base station 800 to communicate with various other apparatus over a backhaul communication link (such as a wired interface). Depending upon the nature of the apparatus, a user interface 812 (such as keypad, display, touch screen, speaker, microphone, control knobs, etc.) also may be provided. Of course, such a user interface 812 is optional, and may be omitted in some examples.

The processor 804 is responsible for managing the bus 802 and general processing, including the execution of software stored on the computer-readable medium 806. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 804, causes the processing system 814 to perform the various functions described below for any particular apparatus. The computer-readable medium 806 and the memory 805 also may be used for storing data that is manipulated by the processor 804 when executing software.

The computer-readable medium 806 may be a non-transitory computer-readable medium. A non-transitory computer-readable medium includes, by way of example, a magnetic storage device (such as hard disk, floppy disk, magnetic strip), an optical disk (such as a compact disc (CD) or a digital versatile disc (DVD)), a smart card, a flash memory device (such as a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. In some examples, the computer-readable medium 806 may be part of the memory 805. Those skilled in the art will recognize how best to implement the described functionality presented throughout this disclosure depending on the particular application and the overall design constraints imposed on the overall system.

In some aspects of the disclosure, the processor 804 may include circuitry configured for various functions. For example, the processor 804 may include resource assignment and scheduling circuitry 842 configured to assign resources and scheduling for signaling radio bearers (SRBs) and data radio bearers (DRBs) with UEs. The resource assignment and scheduling circuitry 842 may further be configured to execute resource assignment and scheduling software 852 stored in the computer-readable medium 806 to implement one or more of the functions described herein.

The processor 804 further includes DL traffic and control generation and transmission circuitry 844 for transmitting DL signaling and data to UEs. For example, with regard to wireless communication system 300, the DL traffic and control generation and transmission circuitry 844 of base station 310 would control the transmission of DL signaling and data to the UE 310. The DL traffic and control channel and transmission circuitry 844 may further be configured to execute DL traffic and control channel reception and processing software 854 stored in the computer-readable medium 806 to implement one or more of the functions described herein.

The processor 804 may further include uplink (UL) traffic and control channel reception and processing circuitry 846, configured to receive and process uplink control channels and uplink traffic channels from one or more UEs. For example, the UL traffic and control channel reception and processing circuitry 846 may be configured to receive channel metrics information from UEs. The UL traffic and control channel reception and processing circuitry 846 may further be configured to execute UL traffic and control channel reception and processing software 856 stored in the computer-readable medium 806 to implement one or more of the functions described herein.

Figure 9:
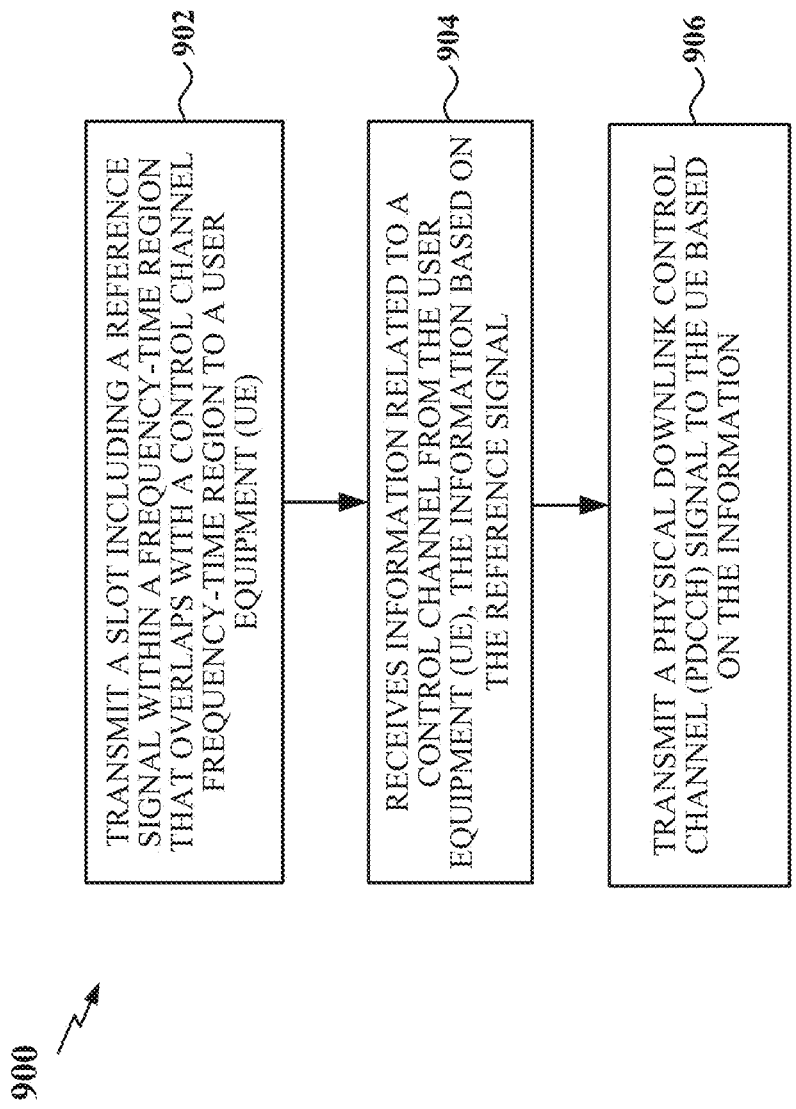
FIG. 9 shows an example flowchart of a method, implemented by the base station of FIG. 8, of transmitting a reference signal to a user equipment (UE) and receiving information on a characterization of the control channel between the base station and the user equipment (UE) based on the reference signal in accordance with another aspect of the disclosure.

FIG. 9 shows an example flowchart of a method 900, implemented by the base station 800, of transmitting a reference signal to a user equipment (UE) and receiving information on a characterization of the control channel between the base station and the user equipment (UE) based on the reference signal in accordance with another aspect of the disclosure. The method 900 includes the processor 804, using the DL traffic and control channel generation and transmission circuitry 844 executing the DL traffic and control channel generation and transmission processing software 854, to transmit a slot including a reference signal within a frequency-time region that overlaps with a control channel frequency-time region to a user equipment (UE) via the wireless transceiver 810 (block 902). The method 900 further includes the processor 804, using the UL traffic and control channel generation and reception circuitry 846 executing the UL traffic and control channel generation and reception processing software 856, to receive information related to a control channel from the user equipment (UE) via the wireless transceiver 810, the information based on the reference signal (block 904). The method 900 further includes the processor 804, using the DL traffic and control channel generation and transmission circuitry 844 executing the DL traffic and control channel generation and transmission processing software 854, to transmit a physical downlink control channel (PDCCH) signal to the user equipment (UE) based on the information (block 906).

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), or the Global System for Mobile (GSM). Various aspects also may be extended to systems defined by the 3rd Generation Partnership Project 2 (3GPP2), such as CDMA2000 or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, or other suitable systems. The actual telecommunication standard, network architecture, or communication standard employed will depend on the specific application and the overall design constraints imposed on the system.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

The invention claimed is:

1. A method for wireless communication at an apparatus of a user equipment (UE), comprising:
receiving a reference signal from a base station, wherein the reference signal is received within a frequency-time region that overlaps with a control channel frequency-time region;
receiving a second reference signal from the base station, wherein the second reference signal is received within a frequency-time region that overlaps with a second control channel frequency-time region;
generating information related to a control channel between the UE and the base station based on the reference signal, the first reference signal, and the second reference signal; and
transmitting the information to the base station.

2. The method of claim 1, wherein the control channel frequency-time region comprises a control resource set (CORESET).

3. The method of claim 1, wherein the reference signal comprises a channel state information-reference signal (CSI-RS).

4. The method of claim 1, wherein a first bandwidth of the reference signal is larger than a second bandwidth of the control channel frequency-time region.

5. The method of claim 1, wherein a first bandwidth of the reference signal is substantially the same as a second bandwidth of the control channel frequency-time region.

6. The method of claim 1, wherein the control channel frequency-time region comprises at least one physical downlink control channel (PDCCH), and wherein the reference signal comprises at least one demodulation reference signal (DMRS) associated with the at least one PDCCH, respectively.

7. The method of claim 1, wherein the control channel frequency-time region comprises a physical downlink control channel (PDCCH), wherein the reference signal comprises a wideband demodulation reference signal (DMRS), wherein a first bandwidth of the wideband DMRS is larger than a second bandwidth of the PDCCH.

8. The method of claim 1, wherein the information comprises a channel quality indicator (CQI).

9. The method of claim 8, wherein the CQI is based on the signal-to-interference-plus-noise ratio (SINR) associated with the control channel between the UE and the base station.

10. The method of claim 1, wherein the information comprises a difference between a first channel quality indicator (CQI) associated with the control channel and a second channel quality indicator (CQI) associated with a data channel between the UE and the base station.

11. The method of claim 1, wherein the information comprises a recommended aggregation level of one or more resource blocks (RBs) for transmitting a physical downlink control channel (PDCCH) signal from the base station to the UE.

12. The method of claim 1, wherein the control channel frequency-time region includes a set of resource element groups (REGs), wherein the frequency-time region of the reference signals overlaps with frequency-time regions of the set of REGs, and wherein the information comprises a set of different information related to the set of REGs, respectively.

13. The method of claim 12, further comprising receiving a parameter indicating a number of REGs in the set from the base station.

14. The method of claim 1, wherein the reference signal is associated with a first transmission configuration indicator (TCI), further comprising receiving the second reference signal associated with a second TCI within a second frequency-time region that overlaps with the control channel frequency-time region, wherein the information is further based on the second reference signal.

15. The method of claim 1, wherein the reference signal is associated with a first multiple-input-multiple-output (MIMO) precoding matrix, further comprising receiving the second reference signal associated with a second MIMO precoding matrix within a second frequency-time region that overlaps with the control channel frequency-time region, wherein the information is further based on the second reference signal.

16. The method of claim 15, wherein the information includes a first channel quality indicator (CQI) based on the reference signal, and a second CQI based on the second reference signal.

17. The method of claim 15, wherein the information identifies a selected one of the reference signal or the second reference signal.

18. The method of claim 1, further comprising receiving a physical downlink control channel (PDCCH) signal from the base station, wherein the PDCCH signal is based on the information.

19. The method of claim 1, wherein the information comprises a single report including channel metrics for a bandwidth part (BWP) associated with the control channel frequency-time region, a set of one or more reports including channel metrics for a set of one or more control channel frequency-time regions, respectively, or a set of one or more reports including channel metrics for a set of one or more REGs within the control channel frequency-time region.

20. A user equipment (UE), comprising:
a wireless transceiver;
a memory; and
a processor communicatively coupled to the wireless transceiver and the memory, wherein the processor and the memory are configured to:
receive a reference signal from a base station via the wireless transceiver, wherein the reference signal is received within a frequency-time region that overlaps with a control channel frequency-time region;
receive a second reference signal from the base station, wherein the second reference signal is received within a frequency-time region that overlaps with a second control channel frequency-time region;

generate information related to a control channel between the UE and the base station based on the reference signal, the first reference signal, and the second reference signal; and transmit the information to the base station via the wireless transceiver.

21. The user equipment (UE) of claim 20, wherein the control channel frequency-time region comprises a control resource set (CORESET).

22. The user equipment (UE) of claim 20, wherein the reference signal comprises a channel state information-reference signal (CSI-RS).

23. The user equipment (UE) of claim 20, wherein a first bandwidth of the reference signal is larger than a second bandwidth of the control channel frequency-time region.

24. The user equipment (UE) of claim 20, wherein a first bandwidth of the reference signal is substantially the same as a second bandwidth of the control channel frequency-time region.

25. The user equipment (UE) of claim 20, wherein the control channel frequency-time region comprises at least one physical downlink control channel (PDCCH), and wherein the reference signal comprises at least one demodulation reference signal (DMRS) decoded from the at least one PDCCH, respectively.

26. The user equipment (UE) of claim 20, wherein the control channel frequency-time region comprises a physical downlink control channel (PDCCH), wherein the reference signal comprises a wideband demodulation reference signal (DMRS), wherein a first bandwidth of the wideband DMRS is larger than a second bandwidth of the PDCCH.

27. The user equipment (UE) of claim 20, wherein the information comprises a channel quality indicator (CQI).

28. The user equipment (UE) of claim 27, wherein the CQI is based on the signal-to-interference-plus-noise ratio (SINR) associated with the control channel between the UE and the base station.

29. The user equipment (UE) of claim 20, wherein the information comprises a difference between a first channel quality indicator (CQI) associated with the control channel and a second channel quality indicator (CQI) associated with a data channel between the UE and the base station.

30. The user equipment (UE) of claim 20, wherein the information comprises a recommended aggregation level of one or more resource blocks (RBs) for transmitting a physical downlink control channel (PDCCH) signal from the base station to the UE.

31. The user equipment (UE) of claim 20, wherein the control channel frequency-time region includes a set of resource element groups (REGs), wherein the frequency-time region of the reference signals overlaps with frequency-time regions of the set of REGs, and wherein the information comprises a set of different information related to the set of REGs, respectively.

32. The user equipment (UE) of claim 31, further comprising receiving a parameter indicating a number of REGs in the set from the base station.

33. The user equipment (UE) of claim 20, wherein the reference signal is associated with a first transmission configuration indicator (TCI), further comprising receiving the second reference signal associated with a second TCI within a second frequency-time region that overlaps with the control channel frequency-time region, wherein the information is further based on the second reference signal.

34. The user equipment (UE) of claim 20, wherein the reference signal is associated with a first multiple-input-multiple-output (MIMO) precoding matrix, further comprising receiving the second reference signal associated with a second MIMO precoding matrix within a second frequency-time region that overlaps with the control channel frequency-time region, wherein the information is further based on the second reference signal.

35. The user equipment (UE) of claim 34, wherein the information includes a first channel quality indicator (CQI) based on the reference signal, and a second CQI based on the second reference signal.

36. The user equipment (UE) of claim 34, wherein the information identifies a selected one of the reference signal or the second reference signal.

37. The user equipment (UE) of claim 20, wherein the processor is further configured to receive a physical downlink control channel (PDCCH) signal from the base station via the wireless transceiver, wherein the PDCCH signal is based on the information.

38. The user equipment (UE) of claim 20, wherein the information comprises a single report including channel metrics for a bandwidth part (BWP) associated with the control channel frequency-time region, a set of one or more reports including channel metrics for a set of one or more control channel frequency-time regions, respectively, or a set of one or more reports including channel metrics for a set of one or more REGs within the control channel frequency-time region.

39. An apparatus for wireless communication, comprising:

means for receiving a reference signal from a base station, wherein the reference signal is received within a frequency-time region that overlaps with a control channel frequency-time region;

means for receiving a second reference signal from the base station, wherein the second reference signal is received within a frequency-time region that overlaps with a second control channel frequency-time region;

means for generating information related to a control channel between the apparatus and the base station based on the reference signal, the first reference signal, and the second reference signal; and means for transmitting the information to the base station.

40. A non-transitory computer-readable medium storing computer-executable code, comprising code for causing a processor in a user equipment to:

receive a reference signal from a base station, wherein the reference signal is received within a frequency-time region that overlaps with a control channel frequency-time region;

receive a second reference signal from the base station, wherein the second reference signal is received within a frequency-time region that overlaps with a second control channel frequency-time region;

generate information related to a control channel between the UE and the base station based on the reference signal, the first reference signal, and the second reference signal; and transmit the information to the base station.

\* \* \* \* \*